United States Patent [19]
Toyama et al.

[11] Patent Number: 5,880,563
[45] Date of Patent: Mar. 9, 1999

[54] DEVICE FOR ACCURATELY DETECTING END OF USAGE LIFETIME OF A DISCHARGE LAMP

[75] Inventors: Koichi Toyama, Kariya; Koichi Kato, Chiryu; Kenji Aida, Kariya, all of Japan

[73] Assignee: Denso Corporation, Kariya, Japan

[21] Appl. No.: 811,210

[22] Filed: Mar. 5, 1997

[30] Foreign Application Priority Data

Mar. 6, 1996 [JP] Japan ..................... 8-049272

[51] Int. Cl.$^6$ ..................... H05B 37/02
[52] U.S. Cl. ............. 315/225; 315/82; 315/129
[58] Field of Search .................. 315/224, 225, 315/226, 209 R, 129, 291, 307, 308, 310, 311, 82

[56] References Cited

U.S. PATENT DOCUMENTS

| | | | |
|---|---|---|---|
| 4,949,018 | 8/1990 | Siglock | 315/225 |
| 5,295,036 | 3/1994 | Yagi et al. | |
| 5,485,059 | 1/1996 | Yamashita et al. | |

FOREIGN PATENT DOCUMENTS

| | | |
|---|---|---|
| 0642296 A2 | 9/1994 | European Pat. Off. . |
| 4331378 A1 | 4/1994 | Germany . |
| U-57-92999 | 11/1980 | Japan . |
| A-60-185396 | 9/1985 | Japan . |
| A-Sho-62-163292 | 7/1987 | Japan . |
| A-Sho-62-200689 | 9/1987 | Japan . |
| U-63-153278 | 10/1988 | Japan . |
| A-6-119982 | 4/1994 | Japan . |
| A Hei-7-201471 | 8/1995 | Japan . |

*Primary Examiner*—Don Wong
*Assistant Examiner*—David H. Vu
*Attorney, Agent, or Firm*—Nixon & Vanderhye P.C.

[57] ABSTRACT

When a discharge lamp repeatedly flickers out after illuminating for a long period of time because the same discharge lamp is nearing the end of its usage lifetime, a stored voltage of a capacitor rises gradually every time the discharge lamp flickers out. When the stored voltage of the same capacitor becomes no less than a predetermined voltage, a comparator generates a high level voltage which actuates a transistor. The transistor then terminates the operations of a PWM circuit to deactuate the discharge lamp.

19 Claims, 5 Drawing Sheets

DEVICE FOR ACCURATELY DETECTING END OF USAGE LIFETIME OF A DISCHARGE LAMP

CROSS-REFERENCE TO RELATED APPLICATION

This application is related to and claims priority from Japanese Patent Application No. Hei-8-49272, the contents of which are hereby incorporated by reference.

BACKGROUND OF THE INVENTION

1. Field of the Invention

The present invention relates to a device for accurately detecting the end of the usage lifetime of a discharge lamp such as a metal halide lamp or the like that is used as a vehicular headlight. Moreover, the present invention also relates to a discharge lamp actuating device that has a unit for detecting the end of the usage lifetime of the discharge lamp.

2. Description of Related Art

Generally, a high voltage pulse is applied to a discharge lamp, which is charged with a few hundred volts of open circuit voltage, to energize the discharge lamp. The discharge lamp is thereby illuminated by switching from a glow discharge state to an arc discharge state. Because the length of a gap between poles of the discharge lamp increases with increasing usage until the end of its usage lifetime, the voltage required to illuminate the discharge lamp increases while its lamp current decreases. Therefore, it is difficult to maintain the discharge operation of the discharge lamp and thus, eventually, such discharge operation stops and the discharge lamp is unusable. When the discharge lamp flickers out while being energized, ordinary discharge lamp actuating devices like those disclosed in Japanese Patent Laid Open Publication No. Hei-6-119982 and U.S. Pat. No. 5,485,059 automatically perform the energization operation again. Therefore, when the discharge lamp, which is near the end of its usage lifetime, stops discharging and flickers out, the discharge lamp actuating device again energizes the discharge lamp. But the discharge lamp eventually flickers out again thereafter.

SUMMARY OF THE INVENTION

In view of the foregoing problems in the prior art, it is a primary object of the present invention to provide a device for accurately detecting the end of the usage lifetime of a discharge lamp. Furthermore, one other object of the present invention is to provide a device for preventing flickering out of the discharge lamp at the end of its usage lifetime.

A first aspect of the present invention provides a device which includes an illumination time measurement unit, a time determination unit, a flickering counting unit and an end of usage lifetime determination unit. The illumination time measurement unit is for measuring an illumination value indicative of a continuous illumination time of a discharge lamp. The time determination unit is for determining if the illumination value exceeds a predetermined value. The flickering counting unit is for counting the number of times the discharge lamp flickers out only when the time determination unit determines that the illumination value exceeds the predetermined value. The end of usage lifetime determination unit is for determining the end of usage lifetime of the discharge lamp based on the number counted by the flickering counting unit.

In this way, the end of usage lifetime of the discharge lamp can be accurately determined because only the flickering out of the discharge lamp after the discharge lamp has been illuminated for no less than a predetermined period is considered.

Preferably, the device further includes a voltage determination unit for determining if an applied voltage to the discharge lamp is no less than a predetermined voltage level.

Preferably, the flickering counting unit includes a first capacitor, a second capacitor whose discharge time constant is larger than the first capacitor and a switch. The switch is for charging the first capacitor and the second capacitor when the voltage determination unit determines that the applied voltage is no less than the predetermined voltage level and for discharging the first capacitor and the second capacitor when the voltage determination unit determines that the applied voltage is lesser than the predetermined voltage level.

Preferably, the device further includes a power supply timing unit and a counting inhibition unit. The power supply timing unit is for measuring an energization period from start of energization of the discharge lamp. The counting inhibition unit is for inhibiting the end of usage lifetime determination unit from determining the end of usage lifetime until the power supply timing unit determines that the energization period exceeds a predetermined time period.

In this way, the end of usage lifetime of the discharge lamp can be accurately determined because only flickering out of the discharge lamp only after the discharge lamp has been energized for no less than a predetermined period of time is considered.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF PRESENTLY PREFERRED EXEMPLARY EMBODIMENT

A preferred embodiment of the present invention is described hereinafter with reference to the accompanying drawings.

Figure 1:
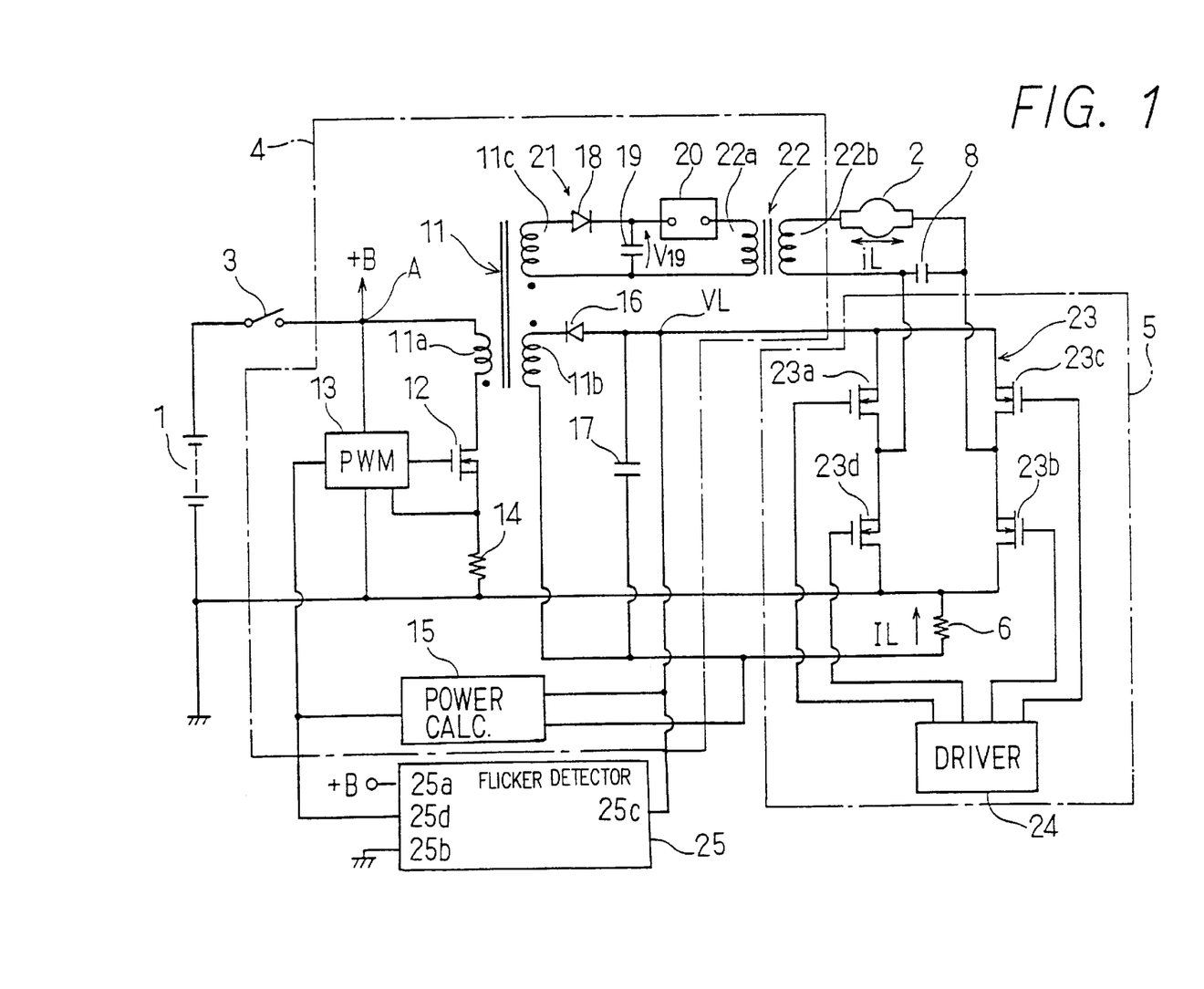
FIG. 1 is a schematic diagram of a discharge lamp actuating device according to an embodiment of the present invention.

As shown in FIG. 1, a discharge lamp actuating device is connected to a battery 1, a high voltage discharge lamp 2 such as a metal halide lamp that is used as a vehicular headlight, a light switch 3 and a capacitor 8 for protecting an H-shaped bridge circuit that is described later from high voltage pulses during the energization of the discharge lamp 2. The discharge lamp actuating device includes a DC power source circuit 4, an inverter circuit 5, a current detection resistor 6 and a flicker detector 25.

The DC power source circuit 4 includes a flyback transformer 11 that has a primary winding 11a disposed at a side of the battery 1 and two secondary windings 11b and 11c disposed at a side of the discharge lamp 2. A primary current of the flyback transformer 11 is controlled by a power MOS transistor 12. Switching operations of the power MOS transistor 12 are controlled by a PWM (pulse width modulation) circuit 13. The PWM circuit 13 detects the primary current using a resistor 14 and controls a gate of the power MOS transistor 12 so that the primary current coincides with a command value from a power calculation circuit 15. The power calculation circuit 15 computes the lamp power based on a terminal voltage of a smoothing capacitor 17, that is, a lamp voltage VL of the discharge lamp 2 and a lamp current IL detected using the current detection resistor 6. Thus, the power calculation circuit 15 provides the command value to the PWM circuit 13 based on the lamp power.

A rectifying diode 16 and the smoothing capacitor 17 are connected to the secondary winding 11b of the flyback transformer 11 for receiving AC current provided by the secondary winding 11b and for rectifying and smoothing the AC current before supplying the same to the H-shaped bridge circuit 23 of the inverter circuit 5. A starting circuit 21 is connected to the secondary winding 11c. The starting circuit 21 includes a rectifying diode 18 and a smoothing capacitor 19, which are for rectifying and smoothing AC current produced by the secondary winding 11c, and a discharge gap 20 for discharging voltage when a charged voltage $V_{19}$ of the capacitor 19 becomes no less than a predetermined voltage. A high voltage coil 22 is connected to the starting circuit 21. The high voltage coil 22 has a primary coil 22a through which discharge current from the discharge gap 20 flows and a secondary coil 22b for generating a high voltage pulse signal based on the discharge current flowing through the primary coil 22a and for applying the high voltage pulse signal to the discharge lamp 2.

The inverter circuit 5 includes four power MOS transistors 23a, 23b, 23c and 23d, which form the H-shaped bridge circuit 23, and a bridge activation circuit 24. The bridge activation circuit 24 is for alternately energizing and deactuating the pair of power MOS transistors 23a and 23b and the pair of power MOS transistors 23c and 23d.

Figure 2:
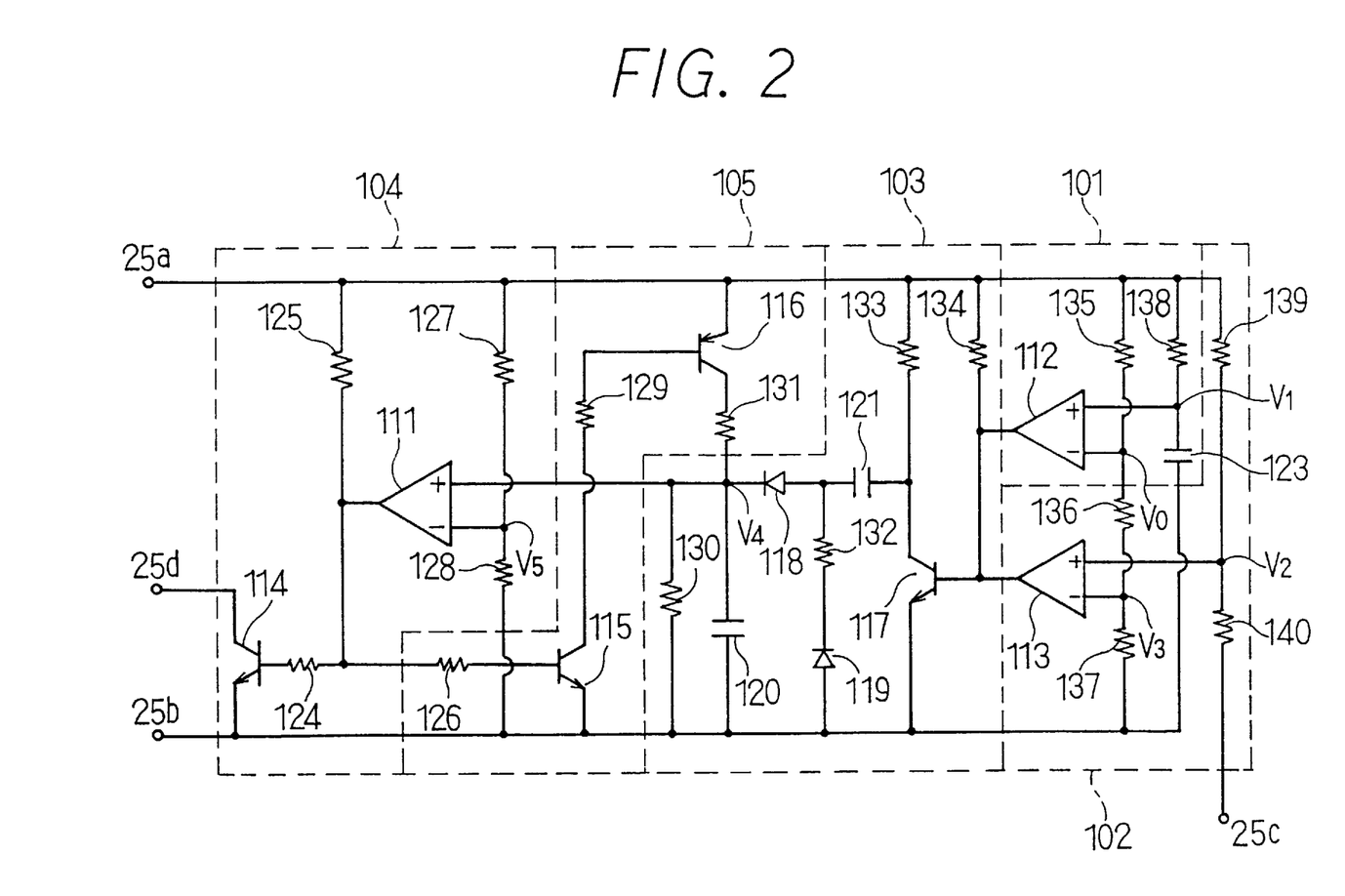
FIG. 2 is a schematic diagram of a flicker detector according to the embodiment of the present invention.

Meanwhile, FIG. 2 shows a detailed construction of the flicker detector 25. The flicker detector 25 includes a timer circuit 101, a lamp voltage detector 102, a counter circuit 103, a terminator circuit 104, a holding circuit 105, power source input terminals 25a and 25b that are connected to the battery 1 via the light switch 3, a lamp voltage detection terminal 25c connected to the capacitor 17, and a power control output terminal 25d connected to the PWM circuit 13.

The timer circuit 101 is for detecting elapsed time from the energization of light switch 3. This timer circuit 101 includes a comparator 112, a capacitor 123 and resistors 135–138. The comparator 112 is for comparing a comparison voltage V0 determined by serially connected resistors 135–138 with a terminal voltage V1 of the capacitor 123. Unless a predetermined time period has elapsed from the actuation of the light switch 3, the comparator 112 generates a low level voltage because the terminal voltage V1 of the capacitor 123 is lower than the comparison voltage V0. The comparator 112 generates a high level voltage after the lapse of the predetermined time period.

The lamp voltage detector 102 includes a comparator 113 and resistors 139 and 140. The comparator 113 compares a voltage V2, which is obtained by dividing lamp voltage VL using resistors 139 and 140, with a voltage V3, which is obtained based on the resistors 135–137. When the magnitude of the lamp voltage VL is no less than a predetermined value (because the lamp voltage VL is set to be a negative voltage, the lamp voltage VL has a large magnitude and a negative polarity), the comparator 113 generates a low level voltage.

The counter circuit 103 is provided at an output side of the lamp voltage detector 102 and counts the number of times the lamp voltage VL has a magnitude that is no less than the predetermined voltage level after the elapse of the predetermined time period after the actuation of the light switch 3 (i.e., start of energization of the discharge lamp 2). The counter circuit 103 includes a transistor 117, diodes 118 and 119, capacitors 120 and 121, and resistors 130, 132, 133 and 134.

While the timer circuit 101 is generating a high level voltage after the elapse of the predetermined time period since the energization of the discharge lamp 2, the discharge lamp 2 in the last stages of its usage lifetime flickers out and a subsequent energization operation causes the lamp voltage VL to have a magnitude that is no less than the predetermined value. Accordingly, when an output of the lamp voltage detector 102 reverts to a low level voltage, the transistor 117 is deactuated to charge the capacitor 120 using the resistor 133, the capacitor 121 and the diode 118. Moreover, the capacitor 120 is charged with a voltage V4 based on relative capacitances of the capacitors 120 and 121. When the discharge lamp 2 is energized again by another energization operation and the output of the lamp voltage detector 102 reverts to a high level voltage with the reduction in the level of the lamp voltage VL, the transistor 117 is actuated to discharge electrical charges stored by the capacitor 121 via the transistor 117, the diode 119 and the resistor 132. Meanwhile, most of the electrical charge stored by the capacitor 120 remains intact with only a small amount of electrical charge discharged because of the large time constant of the capacitor 120. This large time constant is set based on the resistor 130. When the output of the lamp voltage detector 102 reverts to a low level voltage because of the flickering out of the discharge lamp 2, the transistor 117 deactuates to charge the capacitor 120 for the second time. At this time, because there is no remaining electrical charge in the capacitor 121, the capacitor 120 will have the voltage V4 which is the sum of the voltage charged during the first time and a voltage computed based on the relative capacitances of the capacitors 120 and 121. Here, the capacitor 120 is charged whenever the lamp voltage detector 102 detects that the magnitude of the lamp voltage VL is no less than the predetermined level. The voltage V4 increases in accordance with the number of times the magnitude of the lamp voltage VL is determined to be no less than the predetermined value.

The terminator circuit 104 includes a comparator 111, a transistor 114 and resistors 124, 125, 127 and 128. The comparator 111 generates a high level voltage when the voltage V4 of the capacitor 120 of the counter circuit 103 exceeds the voltage V5 divided by the resistors 127 and 128. The actuation of the transistor 114 results in the termination of the operations of the PWM circuit 13.

The holding circuit 105 includes transistors 115 and 116 and resistors 126, 129 and 130. When the comparator 111 generates a high level voltage corresponding to the rise in the voltage V4 of the capacitor 120 in the counter circuit 103, the transistors 115 and 116 are actuated via the resistor 126. Then, the holding circuit 105 raises the voltage V4 of the capacitor 120 via the resistor 131 to maintain the output of the comparator 111 of the terminator circuit 104 at the high level voltage, and thus, the operation of the PWM circuit 13 remains stopped. The energization of the discharge lamp 2 is inhibited through the above-described operation.

Figure 3:
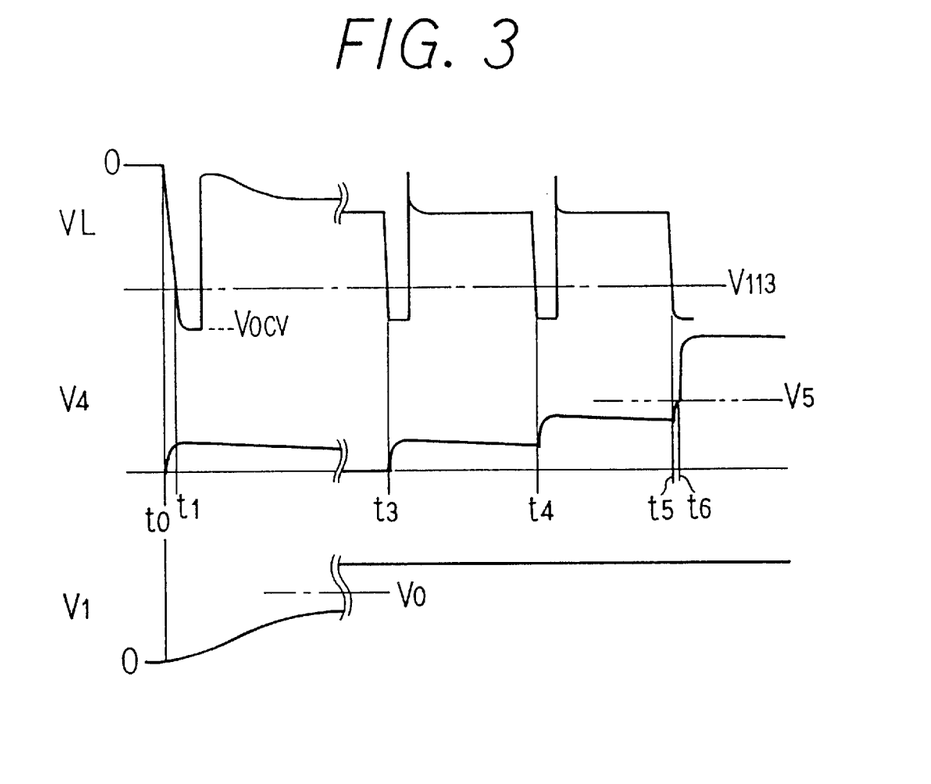
FIG. 3 is a graph showing an operation of the discharge lamp actuating device.

Next, an operation of the discharge lamp actuating device is explained with reference to FIG. 3. The PWM circuit 13 starts to operate when the light switch 3 is actuated at time t0. Then, the capacitor 17 is charged with its open-circuit voltage VOCV being the lamp voltage VL. The lamp voltage VL is set to have a negative polarity to prevent any external leakage of sodium sealed inside the discharge lamp 2.

The charging of the capacitor 123 via the resistor 138 starts when the light switch 3 is actuated. The charged voltage V1 of the capacitor 123 is provided to the comparator 112 and is compared with the comparison voltage V0. When the charged voltage V1 exceeds the comparison voltage V0, the comparator 112 generates a high level voltage. The predetermined time period from the actuation of the light switch 3 up to the time the charged voltage V1 exceeds the comparison voltage V0 is set to a time period sufficient for illuminating the discharge lamp 2. Therefore, the capacitor 120 will be charged because the comparator 112 continues to generate a low level voltage and the transistor 117 remains deliberately deactuated until a predetermined time period elapses from time t0. The charged voltage V4 of the capacitor 120, which is determined based on the relative capacitances of the capacitors 120 and 121, is set to a value that is considerably smaller than the comparison voltage V5. Therefore, the comparator 111 continues to generate the low level voltage. Accordingly, the transistor 114 is maintained in a deactuated state and the PWM circuit 13 continues to operate. Thus, until the predetermined time period lapses from the time t0 when the light switch 3 is actuated, the PWM circuit 13 remains in operation and thus, there is sufficient time for illuminating the discharge lamp 2. Electrical charge of the capacitor 120 is discharged by the resistor 130 while the discharge lamp is in a stable illumination state.

When the discharge lamp 2 flickers out at a time t3 because the discharge lamp 2 is nearing the end of its usage lifetime, the discharge lamp 2 is energized again and thus, the magnitude of the lamp voltage VL increases. When the lamp voltage VL exceeds the predetermined voltage V113, in other words, when voltage V2 is less than the comparison voltage V3, the comparator 113 generates a low level voltage and the transistor 117 is switched off to charge the capacitor 120. Subsequently, the capacitor 120 is charged again when the discharge lamp 2 flickers out at time t4 and thus, the charged voltage V4 of the capacitor 120 rises again. Further, the charged voltage V4 of the capacitor 120 rises even more when the discharge lamp 2 flickers out at time t5. When the charged voltage V4 exceeds the comparison voltage V5, the output of the comparator 111 reverts to the high level voltage and the transistor 114 is actuated to stop the operation of the PWM circuit 13. With the output of the comparator 111 at a high level, the transistors 115 and 116 are closed to charge the capacitor 116. Accordingly, the charged voltage V4 of the capacitor 120 rises further to ensure the termination of operations of the PWM circuit 13.

Figure 4:
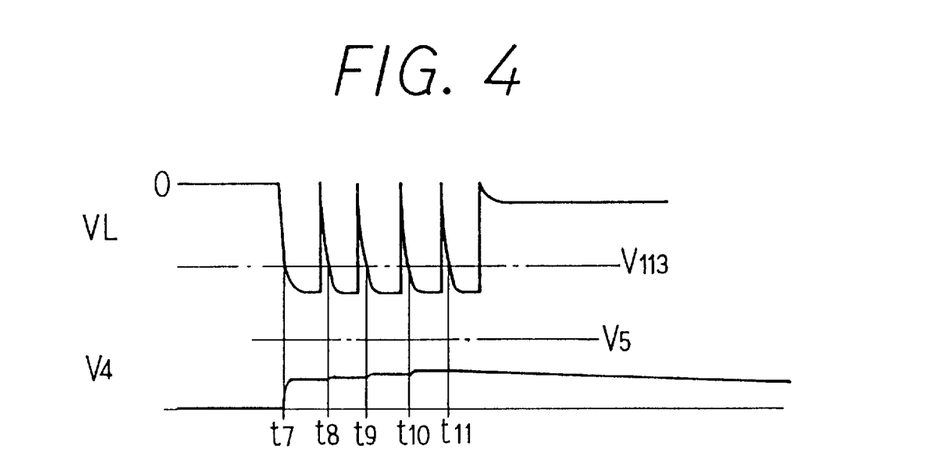
FIG. 4 is a graph showing an operation of the discharge lamp actuating device.

Next, flickering out of the discharge lamp 2 due to factors unrelated to its usage lifetime is explained with reference to FIG. 4. After the discharge lamp 2 flickers out, the lamp voltage VL increases in magnitude because of the re-energization operations and the comparator 113 generates the low level voltage at time t7. Therefore, the transistor 117 is deactuated and the capacitor 120 is charged with the charged voltage V4 based on the electrostatic capacity ratio of the capacitor 120 with the capacitor 121. When the lamp voltage VL decreases in magnitude after a relatively short period of time from time t7, the comparator 113 generates the high level voltage and the transistor 117 is actuated to discharge the capacitor 121. Because a discharge time constant of the capacitor 121 is preset to a large value based on the resistor 132, the electrical charge of the capacitor 121 remains mostly intact without being discharged at time t8 when the lamp voltage VL increases again in magnitude and the comparator 113 generates the low level voltage to deactuate the transistor 117 again. Therefore, the charging of the capacitor 120 starts at time t8 while there is still enough electrical charge in the capacitor 121. Thus, the rise in the charged voltage V4 of the capacitor 120 will be minimal. Although the charged voltage V4 of the capacitor 120 gradually rises little by little at times t9, t10 and t11 when the lamp voltage VL falls and rises, the charged voltage V4 will not reach the comparison voltage V5, and thus, the operation of the PWM circuit 13 is not terminated. Thus, when the time period in which the magnitude of the lamp voltage VL is less than a predetermined value is short, that is, the discharge time period of the discharge lamp 2 is short, the operation of the PWM circuit 13 is not terminated even though the number of times in which the magnitude of the lamp voltage VL is greater than the predetermined voltage level is more than a preset level. In other words, the resistor 132 adjusts the charged voltage V4 of the capacitor 120 in accordance with the discharge time period of the discharge lamp 2. Therefore, re-energization operations of the discharge lamp 2, which are performed when the discharge lamp 2 flickers out due to factors not related to its usage lifetime, are not affected.

Figure 5:
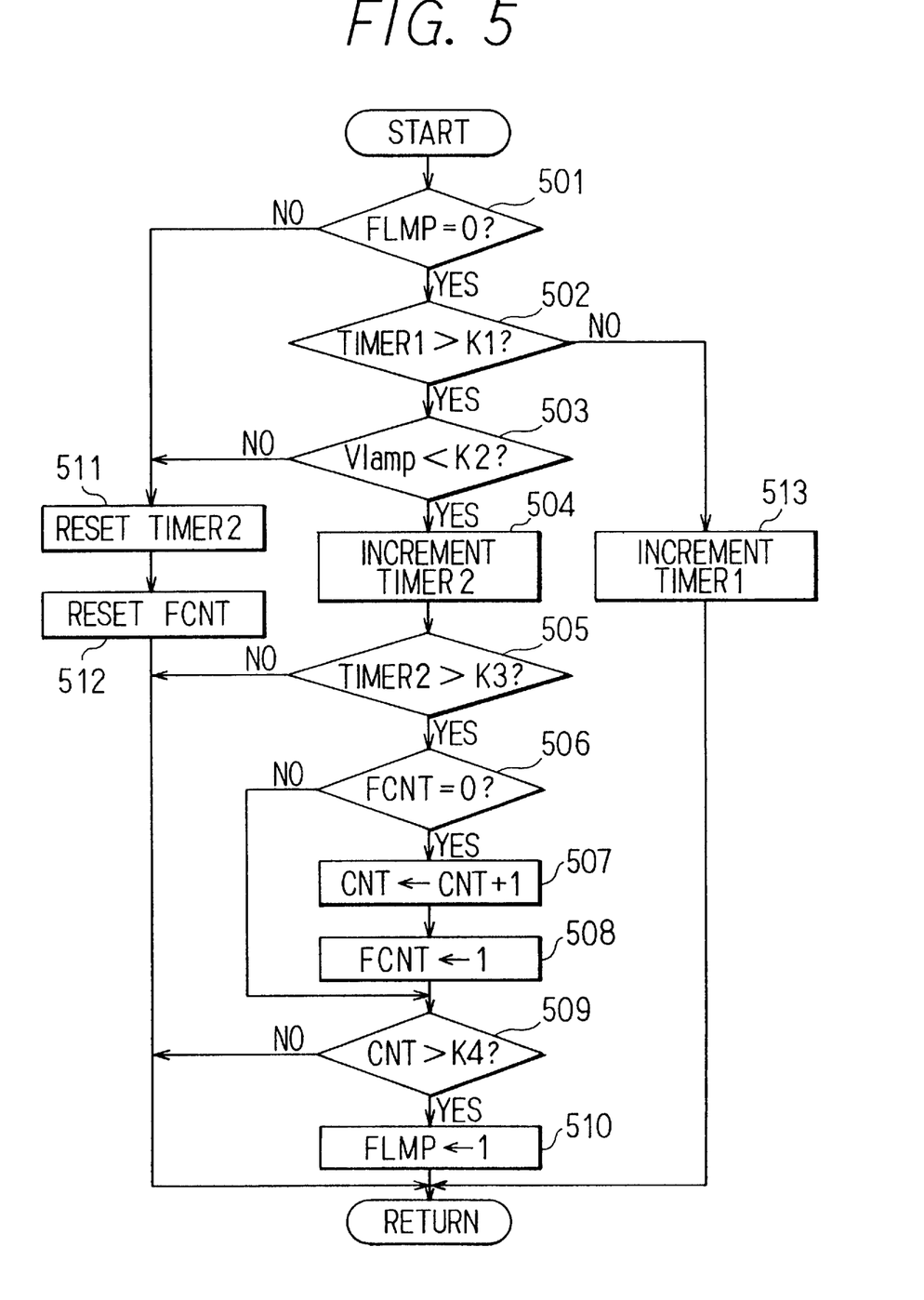
FIG. 5 is a flow chart of a process for detecting the end of the usage lifetime of a discharge lamp.
Figure 6:
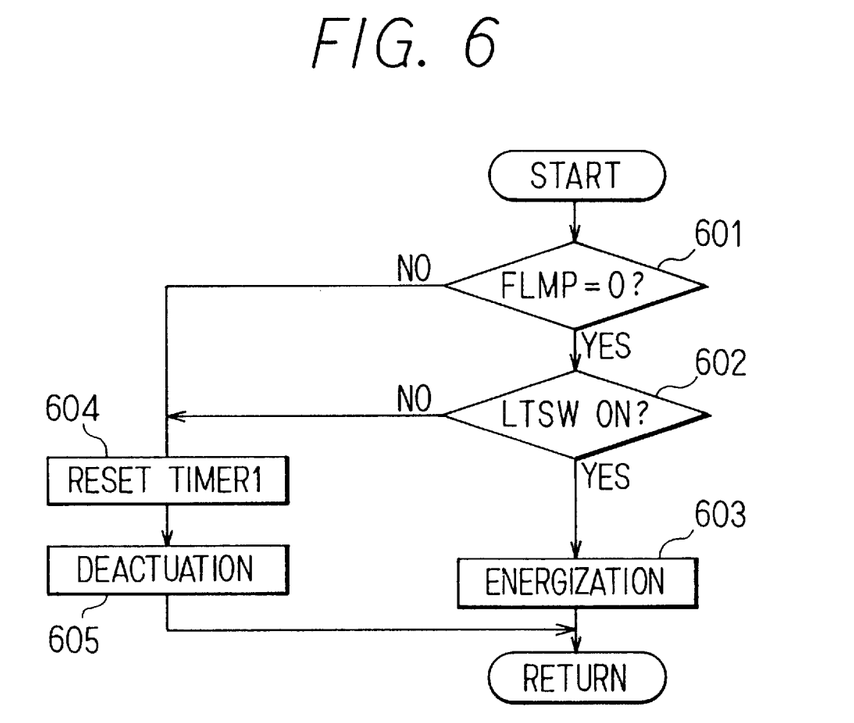
FIG. 6 is a flow chart of a process for energizing the discharge lamp.

While the above operations are performed by the flicker detector, FIGS. 5 and 6 illustrate flow charts of the above-described control processes when these are performed based on microprocessor operations. FIG. 5 illustrates an end of usage lifetime routine while FIG. 6 illustrates an energization routine.

The end of usage lifetime routine is explained hereinafter with reference to a flow chart in FIG. 5. In step 501, FLMP is a flag for indicating an abnormality in the discharge lamp 2. The flag FLMP is reset to indicate that the discharge lamp 2 is normal and is set to indicate that there is an abnormality in the discharge lamp 2. This flag FLMP is initially reset.

In step 502, TIMER1 is a timer value that measures the time elapse since the actuation of the light switch 3 to inhibit the detection of the end of the usage lifetime of the discharge lamp 2 while a predetermined time period has not yet elapsed after the actuation of the light switch 3. K1 is a constant corresponding to the predetermined time period for charging the capacitor 123. Therefore, step 502 determines whether or not the predetermined time period has elapsed after the actuation of the light switch 3. The value TIMER1 is initially reset.

In step 503, Vlamp corresponds to the magnitude of the lamp voltage VL while K2 is a constant that is set in accordance with the magnitude of the above-described predetermined voltage V113. In this way, step 503 determines whether or not the lamp voltage VL is smaller in magnitude than the predetermined voltage V113.

In steps 504 and 505, TIMER2 is a timer value for measuring the length of a time period in which the lamp voltage VL is smaller in magnitude than the predetermined voltage V113. In other words, TIMER2 measures the time period the discharge lamp 2 is in operation. K3 in step 505 indicates a constant which serves as a reference value of the length of the time period the discharge lamp 2 is continuously illuminated. This constant K3 is used for distinguishing between the flickering out of the discharge lamp 2 due to the end of its usage lifetime after a relatively long illumination time period and the flickering out of the discharge lamp 2 due to other factors unrelated to its usage lifetime after a relatively short illumination time period. Therefore, step 505 determines if the flickering out of the discharge lamp 2 is due to the end of its usage lifetime or to other factors.

In steps 506 and 507, FCNT is a flag for ensuring that a counter CNT, which indicates the number of times the discharge lamp 2 flickers out, is incremented only once after step 505 determines that the discharge lamp 2 flickers out due to the end of its usage lifetime. When FCNT is reset, step 507 increments the counter CNT. On the other hand, if FCNT is set, incrementing of the counter CNT is inhibited.

Step 508 sets the flag FCNT and thus, the operation of incrementing the counter CNT is inhibited. In step 509, K4 is a constant which serves as a reference value for a deactuation process of the discharge lamp 2 in the routine of FIG. 6. That is, step 509 determines that the deactuation of the discharge lamp 2 should be carried out when the discharge lamp 2 flickers out during the last stages of its usage lifetime for a number of times that exceeds the constant K4.

Step 510 sets the flag FLMP when step 509 determines that the deactuation process should be carried out on the discharge lamp 2. Meanwhile, step 511 resets the timer TIMER2, step 512 resets the flag FCNT and step 513 increments the timer TIMER1.

Next, the flow of control of the usage lifetime detection routine of FIG. 5 is explained briefly hereinafter. Step 513 uses timer TIMER1 to measure the elapsed time period from the actuation of the light switch 3. When step 502 determines that the elapsed time period exceeds the predetermined time period, step 503 determines if the magnitude of the lamp voltage VL is less than the magnitude of the predetermined voltage V113. When step 503 determines that the lamp voltage VL is less than the predetermined voltage V113, step 504 starts to measure the elapsed time from the start of the discharge operation of the discharge lamp 2. When step 505 determines that the period of continuous discharge operation exceeds the predetermined time period, steps 506–508 increment the time counter CNT which indicates the number of times the discharge lamp 2 has flickered out. When the flickering out of the discharge lamp 2 is due to end of its usage lifetime, the illumination time period exceeds the predetermined time period. When the flickering out of the discharge lamp 2 is due to other factors, the illumination time period will not exceed the predetermined time period because the illumination time period for this case would be extremely short. Therefore, the counter CNT does not count the number of times of flickering out of the discharge lamp 2 due to factors unrelated to the usage lifetime of the same discharge lamp 2.

Meanwhile, step 511 resets TIMER2 while step 512 resets the flag FCNT when the lamp voltage VL again exceeds the predetermined voltage V113. Then, when step 503 determines that the lamp voltage VL is less than the predetermined voltage V113, step 504 again starts counting the illumination time period using the timer TIMER2. When step 505 determines that the illumination time period exceeds the predetermined time period, steps 506–508 increment the number of times the discharge lamp 2 has flickered out and so, the count of counter CNT becomes 2 (steps 506–508). The same processes are carried out and so, step 507 increments the counter CNT by 1. When step 509 determines that the count of counter CNT exceeds the constant K4, step 510 sets the flag FLMP and thus, the usage lifetime of the discharge lamp is determined to be almost over.

The energization routine of FIG. 6 is explained hereinafter. Step 601 determines whether the flag FLMP is reset or not, that is, whether the discharge lamp 2 is normal or not. Step 602 determines whether the light switch 3 is actuated. Step 603 executes a process for energizing the discharge lamp 2. Step 604 resets the timer TIMER1. Step 605 executes a process for turning off the discharge lamp 2. This energization routine deactuates the discharge lamp 2 when the usage lifetime detection routine described above sets the flag FLMP, that is, when an abnormality is determined in the discharge lamp 2.

Although the present invention has been fully described in connection with a preferred embodiment thereof with reference to the accompanying drawings, it is to be noted that various changes and modifications will become apparent to those skilled in the art.

For example, in the above-described embodiment, the number of times the discharge lamp 2 flickers out is detected based on the number of times the discharge lamp 2 is energized. To put it more concretely, the number of the times the discharge lamp 2 flickers out is detected here based on the number of times the lamp voltage VL falls below the predetermined voltage V113. However, the operation for counting the number of times the discharge lamp 2 flickers out is not limited to this type of arrangement. For example, the number of times the discharge lamp 2 is deactuated may also be counted.

Furthermore, in the above-described embodiment, when the usage lifetime of the discharge lamp 2 is determined to be almost over, the energization of the discharge lamp 2 is inhibited; however, such inhibition of the energization of the discharge lamp 2 is not always necessary. For example, when the usage lifetime of the discharge lamp 2 is determined to be almost over, alarm lights may be illuminated to inform a user.

Such changes and modifications are to be understood as being within the scope of the present invention as defined by the appended claims.

What is claimed is:

1. A device for detecting the end of usage lifetime of a discharge lamp, said device comprising:

a light switch to turn on and turn off a discharge lamp;

illumination time measurement means for measuring an illumination value indicative of continuous illumination time of said discharge lamp from each turning on of said light switch;

time determination means for determining if said illumination value exceeds a predetermined value;

flickering counting means for counting the number of times flickering out of said discharge lamp occurs in response to each turning on of said light switch only when said time determination means determines that said illumination value exceeds said predetermined value; and end of usage lifetime determination means for determining the end of usage lifetime of said discharge lamp based on said number counted by said flickering counting means.

2. A device for detecting the end of usage lifetime of a discharge lamp according to claim 1, further comprising:

deactuation means for stopping power supply to said discharge lamp when said end of usage lifetime determination means determines said end of usage lifetime of said discharge lamp.

3. A device for detecting the end of usage lifetime of a discharge lamp according to claim 1, further comprising:

power supply timing means for measuring an energization period from start of energization of said discharge lamp; and counting inhibition means for inhibiting said end of usage lifetime determination means from determining said end of usage lifetime until said power supply timing means determines that said energization period exceeds a predetermined time period.

4. A device for detecting the end of usage lifetime of a discharge lamp said device comprising:

illumination time measurement means for measuring an illumination value indicative of continuous illumination time of a discharge lamp;

time determination means for determining if said illumination value exceeds a predetermined value;

flickering counting means for counting the number of times of flickering out of said discharge lamp only when said time determination means determines that said illumination value exceeds said predetermined value;

end of usage lifetime determination means for determining the end of usage lifetime of said discharge lamp based on said number counted by said flickering counting means;

voltage determination means for determining if an applied voltage to said discharge lamp is no less than a predetermined voltage level, and wherein said flickering counting means includes:
 a first capacitance;
 a second capacitance whose discharge time constant is larger than said first capacitance; and
 a switching circuit for charging said first capacitance and said second capacitance when said voltage determination means determines that said applied voltage is no less than said predetermined voltage level and for discharging said first capacitance and said second capacitance when said voltage determination means determines that said applied voltage is lesser than said predetermined voltage level.

5. A device for detecting the end of usage lifetime of a discharge lamp according to claim 4, further comprising:

power supply timing means for measuring an energization period from start of energization of said discharge lamp; and counting inhibition means for inhibiting said end of usage lifetime determination means from determining said end of usage lifetime until said power supply timing means determines that said energization period exceeds a predetermined time period.

6. A discharge lamp actuating device comprising:

power source means including a light switch for energizing a discharge lamp;

first timing means for measuring a first elapsed time after said power source means energizes said discharge lamp;

first time determination means for determining if said first elapsed time exceeds a predetermined first time period;

second timing means for measuring a second elapsed time after said discharge lamp illuminates from each turning on of said light switch;

second time determination means for determining if said second elapsed time exceeds a predetermined second time period;

flickering counting means for counting a number of times of flickering out of said discharge lamp in response to each turning on of said light switch after said second time determination means determines that said second elapsed time exceeds said second time period;

end of usage lifetime determination means for determining an end in usage lifetime of said discharge lamp based on said number counted by said flickering counting means; and inhibition means for inhibiting said end of usage lifetime determination means from determining said end of usage lifetime unless said first time determination means determines that said first period has elapsed.

7. A method for determining an end in usage lifetime of a discharge lamp, said method comprising the steps of:

measuring a continuous illumination time of a discharge lamp from each manual turning on of a light switch for the discharge lamp;

determining if said illumination time exceeds a predetermined first time period;

counting the number of times flickering out of said discharge lamp occurs in response to each turning on of said light switch after determining said illumination time exceeds said first time period; and determining an end of usage lifetime of said discharge lamp based on said counted number of times said discharge lamp flickers out.

8. A method for determining an end in usage lifetime of a discharge lamp according to claim 7, said method additionally comprising the steps of:

measuring an elapse time from energization of said discharge lamp; and inhibiting determination of said end of usage lifetime of said discharge lamp when said elapse time is less than a predetermined second time period.

9. A method for determining an end in usage lifetime of a discharge lamp, said method comprising the steps of:

detecting a turn-on operation of a light switch for energizing a discharge lamp mounted in a vehicle;

counting the number of times said discharge lamp flickers out after each detection of said turn-on operation; and comparing the counted number of times said flickering out occurs with a reference value to detect an end in usage lifetime of said discharge lamp.

10. A method as in claim 9, wherein:

said counting step detects the number of changes in voltage applied to said discharge lamp.

11. A method as in claim 9, further comprising the steps of:

measuring a time period elapsed from each turn-on operation of said light switch; and disabling said counting step until the measured time period reaches a predetermined period thereby to allow energization of said discharge lamp.

12. A method as in claim 11, further comprising the step of:

disabling energization of said discharge lamp when said comparing step detects said end in usage lifetime.

13. A method as in claim 9, further comprising the steps of:

measuring a time period between two successive flickering out occurrences; and disabling said counting step when the measured time period is shorter than a reference period.

14. Apparatus for determining an end in usage lifetime of a discharge lamp, said apparatus comprising:

means for detecting a turn-on operation of a light switch for energizing a discharge lamp mounted in a vehicle;

means for counting the number of times said discharge lamp flickers out after each detection of said turn-on operation; and means for comparing the counted number of said flickering out occurrences with a reference value to detect an end in usage lifetime of said discharge lamp.

15. Apparatus as in claim 14 wherein:

said means for counting detects the number of changes in voltage applied to said discharge lamp.

16. Apparatus as in claim 14 further comprising:

means for measuring a time period elapsed from each turn-on operation of said light switch; and means for disabling said means for counting until the measured time period reaches a predetermined period thereby to allow energization of said discharge lamp.

17. Apparatus as in claim 16 further comprising:

means for disabling energization of said discharge lamp when said means for comparing detects said end in usage lifetime.

18. Apparatus as in claim 14 further comprising:

means for measuring a time period between two successive said flickering out occurrences; and means for disabling said means for counting when the measured time period is shorter than a reference period.

19. A method for determining the deteriorated condition of a discharge lamp, said method comprising:

after a predetermined period from each manual turn-on of a discharge lamp, counting the number of times the discharge lamp flickers out and therefore lamp driving circuits are forced to re-start the lamp, and comparing said counted number of times the lamp flickers out with a reference value to detect a deteriorated condition of the discharge lamp.

* * * * *